(12) United States Patent
Zhang et al.

(10) Patent No.: US 12,307,742 B2
(45) Date of Patent: May 20, 2025

(54) PERSON RE-IDENTIFICATION METHOD, SYSTEM, AND DEVICE, AND COMPUTER READABLE STORAGE MEDIUM

(71) Applicant: INSPUR SUZHOU INTELLIGENT TECHNOLOGY CO., LTD., Jiangsu (CN)

(72) Inventors: Runze Zhang, Jiangsu (CN); Liang Jin, Jiangsu (CN); Zhenhua Guo, Jiangsu (CN)

(73) Assignee: INSPUR SUZHOU INTELLIGENT TECHNOLOGY CO., LTD., Jiangsu (TW)

( * ) Notice: Subject to any disclaimer, the term of this patent is extended or adjusted under 35 U.S.C. 154(b) by 317 days.

(21) Appl. No.: 17/914,799

(22) PCT Filed: Sep. 24, 2020

(86) PCT No.: PCT/CN2020/117333
§ 371 (c)(1),
(2) Date: Sep. 27, 2022

(87) PCT Pub. No.: WO2021/212737
PCT Pub. Date: Oct. 28, 2021

(65) Prior Publication Data
US 2024/0005633 A1    Jan. 4, 2024

(30) Foreign Application Priority Data
Apr. 23, 2020  (CN) .......................... 202010327772.1

(51) Int. Cl.
*G06V 10/764*  (2022.01)
*G06V 40/10*  (2022.01)

(52) U.S. Cl.
CPC ............ *G06V 10/764* (2022.01); *G06V 40/10* (2022.01)

(58) Field of Classification Search
CPC .... G06V 10/764; G06V 40/10; G06V 10/774; G06V 10/82; G06F 18/214
See application file for complete search history.

(56) References Cited

U.S. PATENT DOCUMENTS

| 2017/0236013 | A1 | 8/2017 | Clayton et al. |
| 2019/0377940 | A1 | 12/2019 | Banerjee et al. |
| 2020/0285896 | A1* | 9/2020 | Huang .............. G06F 18/21322 |

FOREIGN PATENT DOCUMENTS

| CN | 108030494 A | 5/2018 | |
| CN | 108491884 A * | 9/2018 | ........... G06K 9/6215 |

(Continued)

OTHER PUBLICATIONS

G. I. Diaz, A. Fokoue-Nkoutche, G. Nannicini and H. Samulowitz, "An effective algorithm for hyperparameter optimization of neural networks," in IBM Journal of Research and Development, vol. 61, No. 4/5, p. 9:1-9:11, Jul. 1-Sep. 2017, doi: 10.1147/JRD.2017.2709578. (Year: 2017).*

(Continued)

*Primary Examiner* — Stephen R Koziol
*Assistant Examiner* — Ashley L. Hytrek
(74) *Attorney, Agent, or Firm* — Cooper Legal Group, LLC

(57) ABSTRACT

Disclosed are a person Re-identification (Re-ID) method, system, and device, and a computer-readable storage medium. The method includes: acquiring a sample set to be trained (S101); training a pre-constructed person Re-ID model by data re-sampling and cross-validation methods based on the sample set to be trained to obtain a trained person Re-ID model (S102); and performing person Re-ID based on the trained person Re-ID model, wherein persons in any two groups are of different classes after the sample set to be trained is grouped according to the cross-validation method (S103).

14 Claims, 2 Drawing Sheets

(56) References Cited

FOREIGN PATENT DOCUMENTS

| | | | | |
|---|---|---|---|---|
| CN | 109145766 A | 1/2019 | | |
| CN | 109272048 A | 1/2019 | | |
| CN | 110245608 A | 9/2019 | | |
| CN | 110688888 A | * 1/2020 | ............ | G06N 3/045 |
| CN | 111523469 A | 8/2020 | | |
| WO | 2017059576 A1 | 4/2017 | | |

OTHER PUBLICATIONS

J. Kinnison, N. Kremer-Herman, D. Thain and W. Scheirer, "SHADHO: Massively Scalable Hardware-Aware Distributed Hyperparameter Optimization," 2018 IEEE Winter Conference on Applications of Computer Vision (WACV), Lake Tahoe, NV, USA, 2018, pp. 738-747, doi: 10.1109/WACV.2018.00086. (Year: 2018).*
C. Li et al., "AM-LFS: AutoML for Loss Function Search," 2019 IEEE/CVF International Conference on Computer Vision (ICCV), Seoul, Korea (South), 2019, pp. 8409-8418, doi: 10.1109/ICCV. 2019.00850. (Year: 2019).*
International Search Report and English Translation cited in PCT/CN2020/117333 mailed Jan. 26, 2021, 8 pages.
Written Opinion and English Translation cited in PCT/CN2020/117333 mailed Jan. 26, 2021; 10 pages.
First Office Action of corresponding CN priority application CN202010327772.1, dated Apr. 15, 2021; 10 pages.
Second Office Action of corresponding CN priority application CN202010327772.1, dated Aug. 16, 2021; 8 pages.

* cited by examiner

PERSON RE-IDENTIFICATION METHOD, SYSTEM, AND DEVICE, AND COMPUTER READABLE STORAGE MEDIUM

This application claims priority to Chinese Patent Application No. 202010327772.1, filed on Apr. 23, 2020, in China National Intellectual Property Administration and entitled "Person Re-identification Method, System, and Device, and Computer-Readable Storage Medium", the contents of which are hereby incorporated by reference in its entirety.

FIELD

The present application relates to the technical field of person Re-identification (Re-ID), and more particularly to a person Re-ID method, system, and device, and a computer-readable storage medium.

BACKGROUND

Person Re-ID is a technology for determining whether there is a specific person in an image or video sequence by use of computer vision technology. This technology is generally applied to the field of security. In a surveillance video, a relatively low resolution and a particular camera shooting angle usually make it impossible to obtain high-quality images. Therefore, Re-ID becomes an important alternative technology when face recognition and other technologies fail.

Person Re-ID refers to, for a person of interest for one camera, retrieving all images from other cameras including the person. A data set usually includes images obtained by target detection or manual annotation and is usually divided into a training set, a validation set, Query, and Gallery. A model is trained based on the training set. Image features are computed based on the Query set and the Gallery set to obtain feature similarities, thereby obtaining the first N similar images for each image in the Query set. Training and testing require persons not to be repeated. However, in person Re-ID, if a scale of the data set is too small, the data set quality is low, and the problem of class unbalance is severe, it problematic to ensure the person Re-ID effect.

In summary, those skilled in the art are urged to ensure the person Re-ID effect at present.

SUMMARY

An objective of the present application is to provide a person Re-ID method, so as to solve the technical problem of ensuring the person Re-ID effect to some extent. The present application also provides a person Re-ID system and device, and a computer-readable storage medium.

The present application provides the following technical solutions to achieve the above objective.

A person Re-ID method, including:
acquiring a sample set to be trained;
training a pre-constructed person Re-ID model by data re-sampling and cross-validation methods based on the sample set to be trained to obtain a trained person Re-ID model; and
performing person Re-ID based on the trained person Re-ID model,
wherein persons in any two groups are of different classes after the sample set to be trained is grouped according to the cross-validation method.

Preferably, the training a pre-constructed person Re-ID model by data re-sampling and cross-validation methods based on the sample set to be trained to obtain a trained person Re-ID model includes:
removing an image of a person with an image number greater than a first preset value from the sample set to be trained to obtain a remaining sample set;
determining a first target person with an image number less than a second preset value in the remaining sample set;
duplicating an image of the first target person to obtain a first duplicate image;
setting the first duplicate image and the remaining sample set as a first target sample set; and
training the pre-constructed person Re-ID model by the cross-validation method based on the first target sample set.

Preferably, the process of training the pre-constructed person Re-ID model by the cross-validation method based on the first target sample set includes:
determining a second target person with an image number greater than the second preset value and less than the first preset value in the first target sample set, duplicating an image of the second target person to obtain a second duplicate image, and setting the second duplicate image and the first target sample set as a second target sample set, so as to perform training based on the second target sample set.

Preferably, the first preset value includes 100, the second preset value includes 4, and the cross-validation method includes a 4-fold cross-validation method.

Preferably, the process of training a pre-constructed person Re-ID model by data re-sampling and cross-validation methods based on the sample set to be trained to obtain a trained person Re-ID model includes:
determining a hyperparameter type, hyperparameter search space, and hyperparameter adjustment priority of the person Re-ID model; and
training the person Re-ID model based on the hyperparameter type, the hyperparameter search space, and the hyperparameter adjustment priority.

Preferably, the hyperparameter type includes an image number of each person, a boundary of image number, an initial learning rate, a training cycle, a triplet loss threshold, and a Rerank parameter set.

A hyperparameter search space of the image number of each person includes {2, 4, 8}; a hyperparameter search space of the boundary of image number includes {10, 50, 70, 100}; a hyperparameter search space of the initial learning rate includes {0.00035, 0.001, 0.003, 0.01}; a hyperparameter search space of the training cycle comprises {80, 120, 160, 240}; a hyperparameter search space of the triplet loss threshold includes {0.3, 1.2, 4.8, 10.0, 20.0}; a hyperparameter search space of k1 in the Rerank parameter set includes {1, 5, 10, 15, 20}; a hyperparameter search space of k2 in the Rerank parameter set includes {1, 2, 3, 4, 5, 6}; a hyperparameter search space of $\lambda$ in the Rerank parameter set includes {0.3, 0.6, 0.9}.

A sequence of the hyperparameter adjustment priority from high to low includes the training cycle, the initial learning rate, the image number of each person, the triplet loss threshold, the boundary of image number, k1, k2, and $\lambda$.

Preferably, the process of training a pre-constructed person Re-ID model by data re-sampling and cross-validation methods based on the sample set to be trained to obtain a trained person Re-ID model includes:

dividing the sample set to be trained into N grouped sample sets according to person classes, a value of N being equal to a fold count of the cross-validation method;

selecting N−1 grouped sample sets in the N grouped sample sets as a training set, and setting the remaining grouped sample set as a validation set; and training the person Re-ID model with the training set, validating the person Re-ID model with the validation set, and setting an average value of values of mAP and Rank1 computed with the validation set as an accuracy value of the person Re-ID model, so as to perform optimum selection on the person Re-ID model based on the accuracy value.

A person Re-ID system, including:

a first acquiring module, configured to acquire a sample set to be trained;

a first training module, configured to train a pre-constructed person Re-ID model by data re-sampling and cross-validation methods based on the sample set to be trained to obtain a trained person Re-ID model; and a first identifying module, configured to perform person Re-ID based on the trained person Re-ID model, wherein persons in any two groups are of different classes after the sample set to be trained is grouped according to the cross-validation method.

A person Re-ID device, including:

a memory, configured to store a computer program; and a processor, configured to execute the computer program to implement any steps of the person Re-ID method as described above.

A computer-readable storage medium, having a computer program stored thereon which, when executed by a processor, implements any steps of the person Re-ID method as described above.

The person Re-ID method provided in the present application includes: acquiring a sample set to be trained; training a pre-constructed person Re-ID model by data re-sampling and cross-validation methods based on the sample set to be trained to obtain a trained person Re-ID model; and performing person Re-ID based on the trained person Re-ID model, wherein persons in any two groups are of different classes after the sample set to be trained is grouped according to the cross-validation method. In the present application, after acquiring the sample set to be trained, the pre-constructed person Re-ID model is trained by the data re-sampling and cross-validation methods, so that the number of sample sets to be trained after data re-sampling is increased, and persons in any two groups in the cross-validation method are of different classes after the sample set to be trained is grouped according to the cross-validation method. Therefore, the influences of duplicate samples on a training process may be reduced, the training effect is enhanced, and the person Re-ID effect may further be improved. The person Re-ID system and device, and computer-readable storage medium provided in the present application also solve the corresponding technical problem.

BRIEF DESCRIPTION OF THE DRAWINGS

In order to describe the technical solutions in embodiments of the present disclosure or the prior art more clearly, the drawings needed to be used in descriptions of the embodiments or the prior art will be briefly introduced below. Apparently, the drawings in the description below are merely embodiments of the present disclosure. Those ordinarily skilled in the art may further obtain other drawings according to the provided drawings without creative work.

DETAILED DESCRIPTION

The technical solutions in the embodiments of the present disclosure will be described clearly and completely below in combination with the drawings in the embodiments of the present disclosure. Clearly, the described embodiments are not all but only part of the embodiments of the present disclosure. Based on the embodiments of the present invention, all other embodiments obtained by those skilled in the art without creative work shall fall within the protection scope of the present invention.

Figure 1:
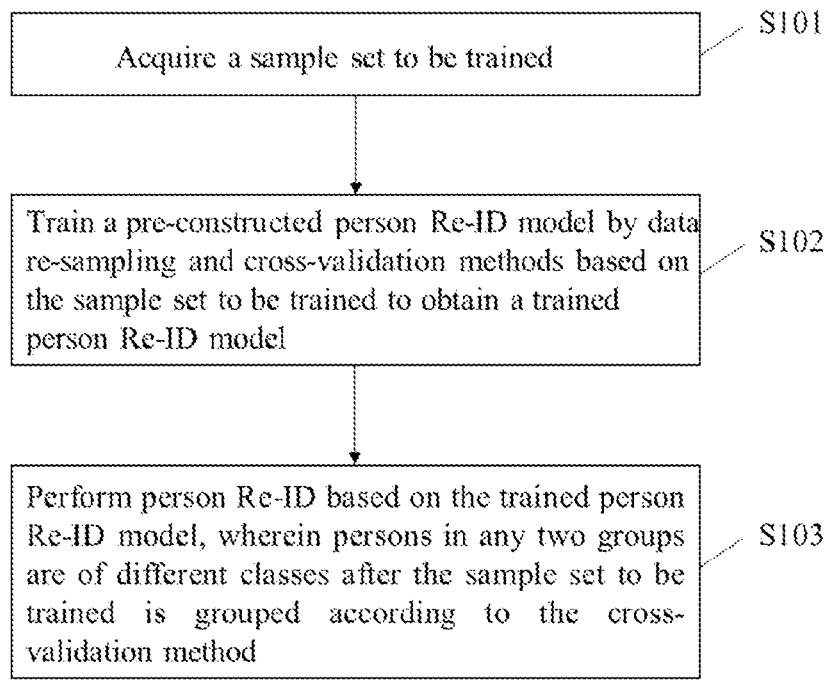
FIG. 1 is a flowchart of a person Re-ID method according to an embodiment of the present application.

Referring to FIG. 1, which is a flowchart of a person Re-ID method according to an embodiment of the present application.

The person Re-ID method provided in the embodiment of the present application may include the following steps.

Step S101: acquire a sample set to be trained.

In practical applications, the sample set to be trained may be acquired first. The sample set to be trained refers to a sample set for training a person Re-ID model, and may include multiple types of images of multiple persons.

Step S102: train a pre-constructed person Re-ID model by data re-sampling and cross-validation methods based on the sample set to be trained to obtain a trained person Re-ID model.

In practical applications, after acquiring the sample set to be trained, the pre-constructed person Re-ID model may be trained by data re-sampling and cross-validation methods based on the sample set to be trained.

It is to be pointed out that samples in the sample set to be trained may be reprocessed by data re-sampling so that the sample set to be trained may meet a training requirement. The person Re-ID model is trained by the cross-validation method, and it is designed that persons in any two groups are of different classes after the sample set to be trained is grouped according to the cross-validation method, whereby influences of duplicate samples on a training process are reduced. In addition, a type of the person Re-ID model in the present application may be determined as practically required. For example, the person Re-ID model may be a neural network model.

Step S103: perform person Re-ID based on the trained person Re-ID model, wherein persons in any two groups are of different classes after the sample set to be trained is grouped according to the cross-validation method.

In practical applications, after obtaining the trained person Re-ID model, person Re-ID may be performed based on the trained person Re-ID model.

The person Re-ID method provided in the present application includes: acquiring a sample set to be trained; training a pre-constructed person Re-ID model by data re-sampling and cross-validation methods based on the sample set to be trained to obtain a trained person Re-ID model; and performing person Re-ID based on the trained person Re-ID model, wherein persons in any two groups are of different classes after the sample set to be trained is grouped according to the cross-validation method. In the present application, after acquiring the sample set to be trained, the pre-constructed person Re-ID model is trained by the data re-sampling and cross-validation methods, so that the number of sample sets to be trained after data re-sampling is increased, and persons in any two groups in the cross-validation method are of different classes after the sample set to be trained is grouped according to the cross-validation method. Therefore, the influences of duplicate samples on a training process may be reduced, the training effect is enhanced, and the person Re-ID effect may further be improved.

In the person Re-ID method provided in the embodiment of the present application, the process of training a pre-constructed person Re-ID model by data re-sampling and cross-validation methods based on the sample set to be trained may specifically be: removing an image of a person with an image number greater than a first preset value from the sample set to be trained to obtain a remaining sample set; determining a first target person with an image number less than a second preset value in the remaining sample set; duplicating an image of the first target person to obtain a first duplicate image; setting the first duplicate image and the remaining sample set as a first target sample set; and training the pre-constructed person Re-ID model by the cross-validation method based on the first target sample set. That is, when the sample set to be trained is processed by data re-sampling before training, the method may include: first removing an image of a person with an image number greater than a first preset value from the sample set to be trained to obtain a remaining sample set; then determining a first target person with an image number less than a second preset value in the remaining sample set; duplicating an image of the first target person to obtain a first duplicate image; setting the first duplicate image and the remaining sample set as a first target sample set; and training the pre-constructed person Re-ID model by the cross-validation method based on the first target sample set.

In practical applications, the process of training the pre-constructed person Re-ID model by the cross-validation method based on the first target sample set may include: determining a second target person with an image number greater than the second preset value and less than the first preset value in the first target sample set, duplicating an image of the second target person to obtain a second duplicate image, and setting the second duplicate image and the first target sample set as a second target sample set, so as to perform training based on the second target sample set. That is, when the sample set to be trained is processed by data re-sampling, the method may include first removing an image of a person with an image number greater than a first preset value from the sample set to be trained to obtain a remaining sample set; determining a first target person with an image number less than a second preset value in the remaining sample set; duplicating an image of the first target person to obtain a first duplicate image; setting the first duplicate image and the remaining sample set as a first target sample set; and then in the process of training the person Re-ID model, determining a second target person with an image number greater than the second preset value and less than the first preset value in the first target sample set, duplicating an image of the second target person to obtain a second duplicate image, and setting the second duplicate image and the first target sample set as a second target sample set, so as to perform training based on the second target sample set.

In practical applications, the first preset value may include 100, the second preset value may include 4, and the cross-validation method may include a 4-fold cross-validation method. In such a case, the image class number of any person in the sample set to be trained is also 4.

In the person Re-ID method provided in the embodiment of the present application, in the process of training a pre-constructed person Re-ID model by data re-sampling and cross-validation methods based on the sample set to be trained, the training process of the person Re-ID model needs to be evaluated, so as to further train the person Re-ID model according to an evaluation result. In such case, the target sample set may be divided into N grouped sample sets according to person classes, a value of N being equal to a fold count of the cross-validation method. For example, the value of N is 4 if a 4-fold cross-validation method is used, and is 5 if a 5-fold cross-validation method is used. N−1 grouped sample sets in the N grouped sample sets are selected as a training set, and the remaining grouped sample set is set as a validation set. The person Re-ID model is trained with the training set, the Re-ID model is validated with the validation set, and an average value of values of mAP and Rank1 computed with the validation set is set as an accuracy value of the person Re-ID model, so as to perform optimum selection on the person Re-ID model based on the accuracy value. It is to be pointed out that both mAP and Rank1 are person Re-ID evaluation indexes in the prior art. In a specific application scenario, during the determination of an optimal value of each type of parameter in the person Re-ID model, the steps provided in the present embodiment may be repeated for N times with other parameters remaining unchanged. An average value of N accuracy values is determined as the accuracy of this parameter, a discrete parameter search space is specified, and the parameter with the highest final accuracy is selected as an optimal value of this parameter.

In the person Re-ID method provided in the embodiment of the present application, in the process of training a pre-constructed person Re-ID model by data re-sampling and cross-validation methods based on the sample set to be trained, hyperparameter information of the person Re-ID model may be determined in advance, so as to perform parameter adjustment on the person Re-ID model rapidly in the training process. In this process, a hyperparameter type, hyperparameter search space, and hyperparameter adjustment priority of the person Re-ID model may be determined first. The person Re-ID model is trained based on the hyperparameter type, the hyperparameter search space, and the hyperparameter adjustment priority.

In practical applications, the hyperparameter type includes an image number of each person, a boundary of image number, an initial learning rate, a training cycle, a triplet loss threshold, and a Rerank parameter set. A hyperparameter search space of the image number of each person includes {2, 4, 8}; a hyperparameter search space of the boundary of image number includes {10, 30, 50, 70, 100}; a hyperparameter search space of the initial learning rate includes {0.00035, 0.001, 0.003, 0.01}; a hyperparameter search space of the training cycle comprises {80, 120, 160, 240}; a hyperparameter search space of the triplet loss threshold includes {0.3, 1.2, 4.8, 10.0, 20.0}; a hyperparameter search space of k1 in the Rerank parameter set includes {1, 5, 10, 15, 20}; a hyperparameter search space of k2 in the Rerank parameter set includes {1, 2, 3, 4, 5, 6}; a hyperparameter search space of λ in the Rerank parameter set includes {0.3, 0.6, 0.9}.

A sequence of the hyperparameter adjustment priority from high to low may include: the training cycle, the initial learning rate, the image number of each person, the triplet loss threshold, the boundary of image number, k1, k2, and λ.

It is to be pointed out that a structure of the person Re-ID model in the present application may be determined as practically required. For example, the person Re-ID model in the present application may be a neural network constructed by a Residual Network (Resnet) 50-based backbone network. The person Re-ID model may have a Batch Size (number of samples selected for one training) of 64 and may include a stem network, four stages of networks, a fully connected layer, etc. In such case, after an image passes through the stem network and network structures of stage 1 to stage 4 of the person Re-ID model, a size of a feature map is 1/32 of original size, and then the feature map is subjected to Global Average Pooling (GAP), and then is input to the final fully connected layer for final classification. A loss function of the person Re-ID model may use a function combining a cross entropy loss and a triplet loss, etc.

In order to describe the effect of the person Re-ID method provided in the present application, the person Re-ID method provided in the present application is now tested in an experimental environment with eight V100 Graphics Processing Units (GPUs). A database uses a Market1501 data set and an NAIC 2019 person Re-ID preliminary contest data set. The Market1501 data set includes 751 persons and a totally 12,936 images, average 17.2 images for training per person. The NAIC 2019 person Re-ID contest data set training set includes 20,429 images. The model uses a Resnet50-based backbone network. Horizontal flipping and random wiping are used for data enhancement. A resolution of an input image is 256*128.

Optimal parameters finally found based on Market1501 are shown in Table 1. Optimal parameters finally found based on the NAIC data set are shown in Table 2. Accuracies obtained under the NAIC data set by use of the parameters in Table 1 and Table 2 based on the validation set are shown in Table 3. Wherein, N represents an image number corresponding to each person, M represents a boundary of image number, lr represents an initial learning rate, epoch represents a training cycle, and a represents a triplet loss threshold. It can be seen that the parameters found based on the two data sets differ greatly, particularly the re-sampling parameter and the triplet loss threshold α, i.e., a threshold of a distance between positive and negative samples. It indicates that data distributions of the two data sets differ greatly, and positive and negative samples in data in NAIC differ relatively greatly and are quite unbalanced in class. In addition, the data in Table 3 shows that different parameters present a great influence on the performance of the model. By the method of the present application, an optimal parameter combination may be obtained well based on the data sets, and good model training and person Re-ID effects may be achieved.

TABLE 1

| Optimal Parameters Found Based on Market1501 | |
| --- | --- |
| N | 4 |
| M | 10 |
| epoch | 120 |
| lr | 0.00035 |
| α | 0.3 |
| k1 | 20 |
| k2 | 6 |
| λ | 0.3 |

TABLE 2

| Optimal Parameters Found Based on NAIC Data Set | |
| --- | --- |
| N | 4 |
| M | 100 |
| epoch | 80 |
| lr | 0.001 |
| α | 10 |
| k1 | 3 |
| k2 | 2 |
| λ | 0.6 |

TABLE 3

| Performance Achieved by Different Parameters Under NAIC Data Set | |
| --- | --- |
| Parameter | Accuracy |
| Table 1 | 75.23 |
| Table 2 | 81.38 |

Figure 2:
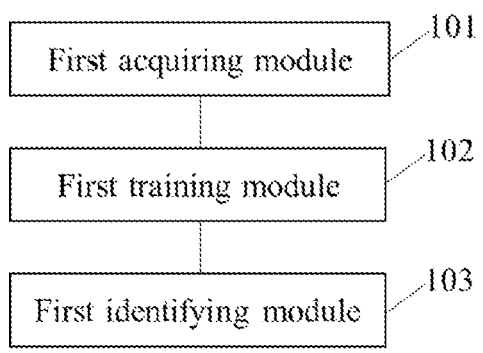
FIG. 2 is a schematic structural diagram of a person Re-ID system according to an embodiment of the present application.

Referring to FIG. 2, which is a schematic structural diagram of a person Re-ID system according to an embodiment of the present application.

The person Re-ID system provided in the embodiment of the present application may include:
  a first acquiring module 101, configured to acquire a sample set to be trained;
  a first training module 102, configured to train a pre-constructed person Re-ID model by data re-sampling and cross-validation methods based on the sample set to be trained to obtain a trained person Re-ID model; and
  a first identifying module 103, configured to perform person Re-ID based on the trained person Re-ID model, wherein persons in any two groups are of different classes after the sample set to be trained is grouped according to the cross-validation method.

According to the person Re-ID system provided in the embodiment of the present application, the first training module may include:
  a first removing unit, configured to remove an image of a person with an image number greater than a first preset value from the sample set to be trained to obtain a remaining sample set;
  a first determination unit, configured to determine a first target person with an image number less than a second preset value in the remaining sample set;
  a first duplicating unit, configured to duplicate an image of the first target person to obtain a first duplicate image;
  a first setting unit, configured to set the first duplicate image and the remaining sample set as a first target sample set; and
  a first training unit, configured to train the pre-constructed person Re-ID model by the cross-validation method based on the first target sample set.

According to the person Re-ID system provided in the embodiment of the present application, the first training unit may include:
 a second training unit, configured to determine a second target person with an image number greater than the second preset value and less than the first preset value in the first target sample set, duplicate an image of the second target person to obtain a second duplicate image, and set the second duplicate image and the first target sample set as a second target sample set, so as to perform training based on the second target sample set.

According to the person Re-ID system provided in the embodiment of the present application, the first preset value may include 100, the second preset value includes 4, and the cross-validation method includes a 4-fold cross-validation method.

According to the person Re-ID system provided in the embodiment of the present application, the first training module may include:
 a first splitting unit, configured to divide the sample set to be trained into N grouped sample sets according to person classes and image classes, a value of N being equal to a fold count of the cross-validation method;
 a second setting unit, configured to select N−1 grouped sample sets in the N grouped sample sets as a training set, and set the remaining grouped sample set as a validation set; and
 a third training unit, configured to train the person Re-ID model with the training set, validate the Re-ID model with the validation set, and set an average value of values of mAP and Rank1 computed with the validation set as an accuracy value of the person Re-ID model, so as to perform optimum selection on the person Re-ID model based on the accuracy value.

According to the person Re-ID system provided in the embodiment of the present application, the first training module may include:
 a second determining unit, configured to determine a hyperparameter type, hyperparameter search space, and hyperparameter adjustment priority of the person Re-ID model; and
 a fourth training unit, configured to train the person Re-ID model based on the hyperparameter type, the hyperparameter search space, and the hyperparameter adjustment priority.

According to the person Re-ID system provided in the embodiment of the present application, the hyperparameter type may include an image number of each person, a boundary of image number, an initial learning rate, a training cycle, a triplet loss threshold, and a Rerank parameter set.

A hyperparameter search space of the image number of each person includes {2, 4, 8}; a hyperparameter search space of the boundary of image number includes {10, 30, 50, 70, 100}; a hyperparameter search space of the initial learning rate includes {0.00035, 0.001, 0.003, 0.01}; a hyperparameter search space of the training cycle comprises {80, 120, 160, 240}; a hyperparameter search space of the triplet loss threshold includes {0.3, 1.2, 4.8, 10.0, 20.0}; a hyperparameter search space of k1 in the Rerank parameter set includes {1, 5, 10, 15, 20}; a hyperparameter search space of k2 in the Rerank parameter set includes {1, 2, 3, 4, 5, 6}; a hyperparameter search space of $\lambda$ in the Rerank parameter set includes {0.3, 0.6, 0.9}.

A sequence of the hyperparameter adjustment priority from high to low includes: the training cycle, the initial learning rate, the image number of each person, the triplet loss threshold, the boundary of image number, k1, k2, and $\lambda$.

Figure 3:
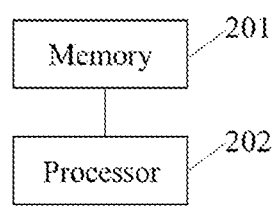
FIG. 3 is a schematic structural diagram of a person Re-ID device according to an embodiment of the present application.

The present application also provides a person Re-ID device and a computer-readable storage medium, both of which have corresponding effects of the person Re-ID method provided in the embodiment of the present application. Referring to FIG. 3, which is a schematic structural diagram of a person Re-ID device according to an embodiment of the present application.

The person Re-ID device provided in the embodiment of the present application includes a memory 201 and a processor 202. The memory 201 has a computer program stored thereon which, when executed by the processor 202, causes the processor to implement the following steps:
 acquiring a sample set to be trained;
 training a pre-constructed person Re-ID model by data re-sampling and cross-validation methods based on the sample set to be trained to obtain a trained person Re-ID model; and
 performing person Re-ID based on the trained person Re-ID model,
 wherein persons in any two groups are of different classes after the sample set to be trained is grouped according to the cross-validation method.

The person Re-ID device provided in the embodiment of the present application includes a memory 201 and a processor 202. The memory 201 has a computer program stored thereon which, when executed by the processor 202, causes the processor to implement the following steps: removing an image of a person with an image number greater than a first preset value from the sample set to be trained to obtain a remaining sample set; determining a first target person with an image number less than a second preset value in the remaining sample set; duplicating an image of the first target person to obtain a first duplicate image; setting the first duplicate image and the remaining sample set as a first target sample set; and training the pre-constructed person Re-ID model by the cross-validation method based on the first target sample set.

The person Re-ID device provided in the embodiment of the present application includes a memory 201 and a processor 202. The memory 201 has a computer program stored thereon which, when executed by the processor 202, causes the processor to implement the following steps: determining a second target person with an image number greater than the second preset value and less than the first preset value in the first target sample set, duplicating an image of the second target person to obtain a second duplicate image, and setting the second duplicate image and the first target sample set as a second target sample set, so as to perform training based on the second target sample set.

The person Re-ID device provided in the embodiment of the present application includes a memory 201 and a processor 202. The memory 201 has a computer program stored thereon which, when executed by the processor 202, causes the processor to implement the following steps: the first preset value including 100, the second preset value including 4, and the cross-validation method including a 4-fold cross-validation method.

The person Re-ID device provided in the embodiment of the present application includes a memory 201 and a processor 202. The memory 201 has a computer program stored thereon which, when executed by the processor 202, causes the processor to implement the following steps: dividing the sample set to be trained into N grouped sample sets according to person classes and image classes, a value of N being equal to a fold count of the cross-validation method; selecting N−1 grouped sample sets in the N grouped sample sets as a training set, and setting the remaining grouped sample set as a validation set; and training the person Re-ID model with the training set, validating the person Re-ID model with the validation set, and setting an average value of values of mAP and Rank1 computed with the validation set as an accuracy value of the person Re-ID model, so as to perform optimum selection on the person Re-ID model based on the accuracy value.

The person Re-ID device provided in the embodiment of the present application includes a memory 201 and a processor 202. The memory 201 has a computer program stored thereon which, when executed by the processor 202, causes the processor to implement the following steps: determining a hyperparameter type, hyperparameter search space, and hyperparameter adjustment priority of the person Re-ID model; and training the person Re-ID model based on the hyperparameter type, the hyperparameter search space, and the hyperparameter adjustment priority.

The person Re-ID device provided in the embodiment of the present application includes a memory 201 and a processor 202. The memory 201 has a computer program stored thereon which, when executed by the processor 202, causes the processor to implement the following steps: the hyperparameter type includes an image number of each person, a boundary of image number, an initial learning rate, a training cycle, a triplet loss threshold, and a Rerank parameter set; wherein a hyperparameter search space of the image number of each person includes {2, 4, 8}; a hyperparameter search space of the boundary of image number includes {10, 30, 50, 70, 100}; a hyperparameter search space of the initial learning rate includes {0.00035, 0.001, 0.003, 0.01}; a hyperparameter search space of the training cycle comprises {80, 120, 160, 240}; a hyperparameter search space of the triplet loss threshold includes {0.3, 1.2, 4.8, 10.0, 20.0}; a hyperparameter search space of k1 in the Rerank parameter set includes {1, 5, 10, 15, 20}; a hyperparameter search space of k2 in the Rerank parameter set includes {1, 2, 3, 4, 5, 6}; a hyperparameter search space of $\lambda$ in the Rerank parameter set includes {0.3, 0.6, 0.9}; and a sequence of the hyperparameter adjustment priority from high to low includes: the training cycle, the initial learning rate, the image number of each person, the triplet loss threshold, the boundary of image number, k1, k2 and $\Delta$.

Figure 4:
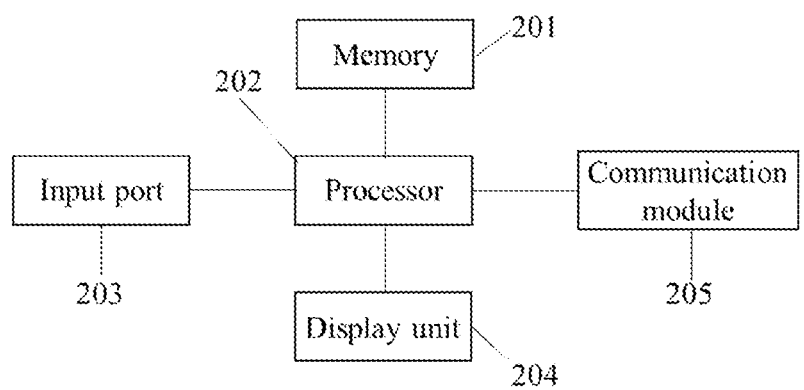
FIG. 4 is another schematic structural diagram of a person Re-ID device according to an embodiment of the present application.

Referring to FIG. 4, another person Re-ID device provided in the embodiment of the present application may further include: an input port 203 connected with the processor 202, configured to transmit an external input command to the processor 202; a display unit 204 connected with the processor 202, configured to display a processing result of the processor 202 to the outside; and a communication module 205 connected with the processor 202, configured to implement communication between the person Re-ID device and the outside. The display unit 204 may be a display panel, a laser scanning display, etc. A communication mode used by the communication module 205 includes, but not limited to, High-definition Mobile Link (HML), Universal Serial Bus (USB), High-Definition Multimedia Interface (HDMI), and wireless connection, i.e., Wireless Fidelity (WiFi), Bluetooth communication, low-power Bluetooth communication, and IEEE802.11s-based communication.

The computer-readable storage medium provided in the embodiment of the present application has a computer program stored thereon which, when executed by a processor, implements the following steps:

acquiring a sample set to be trained;

training a pre-constructed person Re-ID model by data re-sampling and cross-validation methods based on the sample set to be trained to obtain a trained person Re-ID model; and performing person Re-ID based on the trained person Re-ID model, wherein persons in any two groups are of different classes after the sample set to be trained is grouped according to the cross-validation method.

The computer-readable storage medium provided in the embodiment of the present application has a computer program stored thereon which, when executed by a processor, implements the following steps: removing an image of a person with an image number greater than a first preset value from the sample set to be trained to obtain a remaining sample set; determining a first target person with an image number less than a second preset value in the remaining sample set; duplicating an image of the first target person to obtain a first duplicate image; setting the first duplicate image and the remaining sample set as a first target sample set; and training the pre-constructed person Re-ID model by the cross-validation method based on the first target sample set.

The computer-readable storage medium provided in the embodiment of the present application has a computer program stored thereon which, when executed by a processor, implements the following steps: determining a second target person with an image number greater than the second preset value and less than the first preset value in the first target sample set, duplicating an image of the second target person to obtain a second duplicate image, and setting the second duplicate image and the first target sample set as a second target sample set, so as to perform training based on the second target sample set.

The computer-readable storage medium provided in the embodiment of the present application has a computer program stored thereon which, when executed by a processor, implements the following steps: the first preset value including 100, the second preset value including 4, and the cross-validation method including a 4-fold cross-validation method.

The computer-readable storage medium provided in the embodiment of the present application has a computer program stored thereon which, when executed by a processor, implements the following steps: dividing the sample set to be trained into N grouped sample sets according to person classes and image classes, a value of N being equal to a fold count of the cross-validation method; selecting N−1 grouped sample sets in the N grouped sample sets as a training set, and setting the remaining grouped sample set as a validation set; and training the person Re-ID model with the training set, validating the person Re-ID model with the validation set, and setting an average value of values of mAP and Rank1 computed with the validation set as an accuracy value of the person Re-ID model, so as to perform optimum selection on the person Re-ID model based on the accuracy value.

The computer-readable storage medium provided in the embodiment of the present application has a computer program stored thereon which, when executed by a processor, implements the following steps: determining a hyperparameter type, hyperparameter search space, and hyperparameter adjustment priority of the person Re-ID model; and training the person Re-ID model based on the hyperparameter type, the hyperparameter search space, and the hyperparameter adjustment priority.

The computer-readable storage medium provided in the embodiment of the present application has a computer program stored thereon which, when executed by a processor, implements the following steps: the hyperparameter type includes an image number of each person, a boundary of image number, an initial learning rate, a training cycle, a triplet loss threshold, and a Rerank parameter set; wherein a hyperparameter search space of the image number of each person includes {2, 4, 8}; a hyperparameter search space of the boundary of image number includes {10, 30, 50, 70, 100}; a hyperparameter search space of the initial learning rate includes {0.00035, 0.001, 0.003, 0.01}; a hyperparameter search space of the training cycle comprises {80, 120, 160, 240}; a hyperparameter search space of the triplet loss threshold includes {0.3, 1.2, 4.8, 10.0, 20.0}; a hyperparameter search space of k1 in the Rerank parameter set includes {1, 5, 10, 15, 20}; a hyperparameter search space of k2 in the Rerank parameter set includes {1, 2, 3, 4, 5, 6}; a hyperparameter search space of $\lambda$ in the Rerank parameter set includes {0.3, 0.6, 0.9}; and a sequence of the hyperparameter adjustment priority from high to low includes: the training cycle, the initial learning rate, the image number of each person, the triplet loss threshold, the boundary of image number, k1, k2 and $\lambda$.

The computer-readable storage medium involved in the present application includes a Random Access Memory (RAM), an internal memory, a Read-Only Memory (ROM), an electrically programmable ROM, an electrically erasable programmable ROM, a register, a hard disk, a removable disk, a Compact Disc Read-Only Memory (CD-ROM), or a storage medium in any other form well known in this art.

Descriptions about related parts in the person Re-ID system and device, and computer-readable storage medium provided in the embodiments of the present application refer to detailed descriptions about the corresponding parts in the person Re-ID method provided in the embodiments of the present application. Elaborations are omitted herein. In addition, the parts consistent with implementation principles of corresponding technical solutions in the prior art in the technical solutions provided in the embodiments of the present application are not described in detail, so as to avoid elaborations.

It is also noted that in this specification, relationship terms such as first and second are used only to distinguish one entity or operation from another entity or operation, without necessarily requiring or implying any such actual relationship or order between those entities or operations. Further, the terms "include", "comprise" or any other variation thereof are intended to cover non-exclusive inclusion, so that a process, method, article, or apparatus that includes a set of elements includes not only those elements, but also other elements not expressly listed, or also include elements that are inherent to such process, method, article, or apparatus. Without further limitation, the elements defined by the statement "comprising a" do not preclude the existence of additional identical elements in the process, method, article, or apparatus that include said elements.

The disclosed embodiments are described above to enable those skilled in the art to implement or use the present application. Various modifications to these embodiments are apparent to those skilled in the art. The general principles defined herein may be implemented in other embodiments without departing from the spirit or scope of the present application. Therefore, the present application will not be limited to these embodiments shown herein but is consistent with the largest scope consistent with the principles and novel characteristics disclosed herein.

The invention claimed is:

1. A person Re-identification (Re-ID) method, comprising:
   acquiring a sample set to be trained;
   training a pre-constructed person Re-ID model by a data re-sampling method and a cross-validation method based on the sample set to be trained to obtain a trained person Re-ID model; and
   performing person Re-ID based on the trained person Re-ID model;
   wherein persons in any two groups are of different classes after the sample set to be trained is grouped according to the cross-validation method;
   wherein the training the pre-constructed person Re-ID model by the data re-sampling method and the cross-validation method based on the sample set to be trained to obtain the trained person Re-ID model comprises:
      determining a hyperparameter type, hyperparameter search space, and hyperparameter adjustment priority of the pre-constructed person Re-ID model, wherein the hyperparameter type comprises an image number of each person, a boundary of image number, an initial learning rate, a training cycle, a triplet loss threshold, and a Rerank parameter set; and
      training the pre-constructed person Re-ID model based on the hyperparameter type, the hyperparameter search space, and the hyperparameter adjustment priority;
   wherein a hyperparameter search space of the image number of each person comprises {2, 4, 8}; a hyperparameter search space of the boundary of image number comprises {10, 30, 50, 70, 100}; a hyperparameter search space of the initial learning rate comprises {0.00035, 0.001, 0.003, 0.01}; a hyperparameter search space of the training cycle comprises {80, 120, 160, 240}; a hyperparameter search space of the triplet loss threshold comprises {0.3, 1.2, 4.8, 10.0, 20.0}; a hyperparameter search space of k1 in the Rerank parameter set comprises {1, 5, 10, 15, 20}; a hyperparameter search space of k2 in the Rerank parameter set comprises {1, 2, 3, 4, 5, 6}; and a hyperparameter search space of $\lambda$ in the Rerank parameter set comprises {0.3, 0.6, 0.9}; and
   wherein a sequence of the hyperparameter adjustment priority from high to low comprises: the training cycle, the initial learning rate, the image number of each person, the triplet loss threshold, the boundary of image number, k1, k2, and $\lambda$.

2. The method according to claim 1, wherein the training the pre-constructed person Re-ID model by the data re-sampling method and the cross-validation method based on the sample set to be trained to obtain the trained person Re-ID model comprises:
   removing an image of a person with an image number greater than a first preset value from the sample set to be trained to obtain a remaining sample set;
   determining a first target person with an image number less than a second preset value in the remaining sample set;
   duplicating an image of the first target person to obtain a first duplicate image;
   setting the first duplicate image and the remaining sample set as a first target sample set; and
   training the pre-constructed person Re-ID model by the cross-validation method based on the first target sample set.

3. The method according to claim 2, wherein the training the pre-constructed person Re-ID model by the cross-validation method based on the first target sample set comprises:

determining a second target person with an image number greater than the second preset value and less than the first preset value in the first target sample set, duplicating an image of the second target person to obtain a second duplicate image, and setting the second duplicate image and the first target sample set as a second target sample set, so as to perform training based on the second target sample set.

4. The method according to claim 2, wherein the first preset value comprises 100, the second preset value comprises 4, and the cross-validation method comprises a 4-fold cross-validation method.

5. The method according to claim 1, wherein the training the pre-constructed person Re-ID model by the data re-sampling method and the cross-validation method based on the sample set to be trained comprises:

dividing the sample set to be trained into N grouped sample sets according to person classes, a value of N being equal to a fold count of the cross-validation method;

selecting N−1 grouped sample sets in the N grouped sample sets as a training set, and setting a remaining grouped sample set as a validation set; and training the pre-constructed person Re-ID model with the training set, validating the trained person Re-ID model with the validation set, and setting an average value of values of mAP and Rank1 computed with the validation set as an accuracy value of the trained person Re-ID model, so as to perform optimum selection on the trained person Re-ID model based on the accuracy value.

6. A person Re-identification (Re-ID) device, comprising:
a memory, configured to store a computer program;
a processor, configured to execute the computer program to implement a person Re-ID method, wherein the person Re-ID method comprises:
  acquiring a sample set to be trained;
  training a pre-constructed person Re-ID model by a data re-sampling method and a cross-validation method based on the sample set to be trained to obtain a trained person Re-ID model; and
  performing person Re-ID based on the trained person Re-ID model;
  wherein persons in any two groups are of different classes after the sample set to be trained is grouped according to the cross-validation method;
  wherein the training the pre-constructed person Re-ID model by the data re-sampling method and the cross-validation method based on the sample set to be trained to obtain the trained person Re-ID model comprises:
    determining a hyperparameter type, hyperparameter search space, and hyperparameter adjustment priority of the pre-constructed person Re-ID model, wherein the hyperparameter type comprises an image number of each person, a boundary of image number, an initial learning rate, a training cycle, a triplet loss threshold, and a Rerank parameter set; and
    training the pre-constructed person Re-ID model based on the hyperparameter type, the hyperparameter search space, and the hyperparameter adjustment priority;

wherein a hyperparameter search space of the image number of each person comprises {2, 4, 8}; a hyperparameter search space of the boundary of image number comprises {10, 30, 50, 70, 100}; a hyperparameter search space of the initial learning rate comprises {0.00035, 0.001, 0.003, 0.01}; a hyperparameter search space of the training cycle comprises {80, 120, 160, 240}; a hyperparameter search space of the triplet loss threshold comprises {0.3, 1.2, 4.8, 10.0, 20.0}; a hyperparameter search space of k1 in the Rerank parameter set comprises {1, 5, 10, 15, 20}; a hyperparameter search space of k2 in the Rerank parameter set comprises {1, 2, 3, 4, 5, 6}; and a hyperparameter search space of λ in the Rerank parameter set comprises {0.3, 0.6, 0.9}; and wherein a sequence of the hyperparameter adjustment priority from high to low comprises: the training cycle, the initial learning rate, the image number of each person, the triplet loss threshold, the boundary of image number, k1, k2, and λ.

7. A non-transitory computer-readable storage medium, having a computer program stored thereon which, when executed by a processor, implements a person Re-identification (Re-ID) method, wherein the person Re-ID method comprises:

acquiring a sample set to be trained;
training a pre-constructed person Re-ID model by a data re-sampling method and a cross-validation method based on the sample set to be trained to obtain a trained person Re-ID model; and
performing person Re-ID based on the trained person Re-ID model;
wherein persons in any two groups are of different classes after the sample set to be trained is grouped according to the cross-validation method;
wherein the training the pre-constructed person Re-ID model by the data re-sampling method and the cross-validation method based on the sample set to be trained to obtain the trained person Re-ID model comprises:
  determining a hyperparameter type, hyperparameter search space, and hyperparameter adjustment priority of the pre-constructed person Re-ID model, wherein the hyperparameter type comprises an image number of each person, a boundary of image number, an initial learning rate, a training cycle, a triplet loss threshold, and a Rerank parameter set; and
  training the pre-constructed person Re-ID model based on the hyperparameter type, the hyperparameter search space, and the hyperparameter adjustment priority;
wherein a hyperparameter search space of the image number of each person comprises {2, 4, 8}; a hyperparameter search space of the boundary of image number comprises {10, 30, 50, 70, 100}; a hyperparameter search space of the initial learning rate comprises {0.00035, 0.001, 0.003, 0.01}; a hyperparameter search space of the training cycle comprises {80, 120, 160, 240}; a hyperparameter search space of the triplet loss threshold comprises {0.3, 1.2, 4.8, 10.0, 20.0}; a hyperparameter search space of k1 in the Rerank parameter set comprises {1, 5, 10, 15, 20}; a hyperparameter search space of k2 in the Rerank parameter set comprises {1, 2, 3, 4, 5, 6}; and a hyperparameter search space of λ in the Rerank parameter set comprises {0.3, 0.6, 0.9}; and wherein a sequence of the hyperparameter adjustment priority from high to low comprises: the training cycle, the initial learning rate, the image number of each person, the triplet loss threshold, the boundary of image number, k1, k2, and λ.

8. The person Re-identification (Re-ID) device according to claim 6, wherein the training the pre-constructed person Re-ID model by the data re-sampling method and the cross-validation method based on the sample set to be trained to obtain the trained person Re-ID model comprises:

removing an image of a person with an image number greater than a first preset value from the sample set to be trained to obtain a remaining sample set;

determining a first target person with an image number less than a second preset value in the remaining sample set;

duplicating an image of the first target person to obtain a first duplicate image;

setting the first duplicate image and the remaining sample set as a first target sample set; and training the pre-constructed person Re-ID model by the cross-validation method based on the first target sample set.

9. The person Re-identification (Re-ID) device according to claim 8, wherein the training the pre-constructed person Re-ID model by the cross-validation method based on the first target sample set comprises:

determining a second target person with an image number greater than the second preset value and less than the first preset value in the first target sample set, duplicating an image of the second target person to obtain a second duplicate image, and setting the second duplicate image and the first target sample set as a second target sample set, so as to perform training based on the second target sample set.

10. The person Re-identification (Re-ID) device according to claim 8, wherein the first preset value comprises 100, the second preset value comprises 4, and the cross-validation method comprises a 4-fold cross-validation method.

11. The person Re-identification (Re-ID) device according to claim 6, wherein the training the pre-constructed person Re-ID model by the data re-sampling method and the cross-validation method based on the sample set to be trained comprises:

dividing the sample set to be trained into N grouped sample sets according to person classes, a value of N being equal to a fold count of the cross-validation method;

selecting N−1 grouped sample sets in the N grouped sample sets as a training set, and setting a remaining grouped sample set as a validation set; and training the pre-constructed person Re-ID model with the training set, validating the trained person Re-ID model with the validation set, and setting an average value of values of mAP and Rank1 computed with the validation set as an accuracy value of the trained person Re-ID model, so as to perform optimum selection on the trained person Re-ID model based on the accuracy value.

12. The non-transitory computer-readable storage medium according to claim 7, wherein the training the pre-constructed person Re-ID model by the data re-sampling method and the cross-validation method based on the sample set to be trained to obtain the trained person Re-ID model comprises:

removing an image of a person with an image number greater than a first preset value from the sample set to be trained to obtain a remaining sample set;

determining a first target person with an image number less than a second preset value in the remaining sample set;

duplicating an image of the first target person to obtain a first duplicate image;

setting the first duplicate image and the remaining sample set as a first target sample set; and training the pre-constructed person Re-ID model by the cross-validation method based on the first target sample set.

13. The non-transitory computer-readable storage medium according to claim 12, wherein the training the pre-constructed person Re-ID model by the cross-validation method based on the first target sample set comprises:

determining a second target person with an image number greater than the second preset value and less than the first preset value in the first target sample set, duplicating an image of the second target person to obtain a second duplicate image, and setting the second duplicate image and the first target sample set as a second target sample set, so as to perform training based on the second target sample set.

14. The non-transitory computer-readable storage medium according to claim 12, wherein the first preset value comprises 100, the second preset value comprises 4, and the cross-validation method comprises a 4-fold cross-validation method.

* * * * *